H. H. BOHANNON AND C. Z. HARDEN.
AUTOMATIC PRESSURE COMPENSATOR.
APPLICATION FILED MAY 3, 1919.

1,323,955.

Patented Dec. 2, 1919.

Witnesses
R. A. Thomas

Inventors
H. H. Bohannon
C. Z. Harden
By Victor J. Evans
Attorney

UNITED STATES PATENT OFFICE.

HOYT H. BOHANNON AND CLYDE Z. HARDEN, OF ASHBURN, GEORGIA.

AUTOMATIC PRESSURE-COMPENSATOR.

1,323,955.   Specification of Letters Patent.   Patented Dec. 2, 1919.

Application filed May 3, 1919.   Serial No. 294,584.

*To all whom it may concern:*

Be it known that we, HOYT H. BOHANNON and CLYDE Z. HARDEN, citizens of the United States, residing at Ashburn, in the county of Turner and State of Georgia, have invented new and useful Improvements in Automatic Pressure-Compensators, of which the following is a specification.

The object of this invention is to relieve the pressure in a water pipe, water jacket, or other water container, due to the freezing and expansion of the fluid, in order to prevent bursting.

A further object is to provide a compensating device comprising a cylinder with a plunger operating therein, said cylinder being connected with the water pipe, and the plunger being normally retained in one end of the cylinder under the pressure of a resilient device retaining the plunger inoperative against the usual pressure of the water in the pipe.

A further object is to provide a device of the type indicated in which the cylinder containing the plunger shall be provided with an outer chamber of such diameter that the chamber may receive a suitable quantity of oil, the latter serving to prevent the fluid within the entrance portion of the cylinder, or the moisture within the remaining portion of the cylinder from freezing, and thereby rendering the device inoperative.

With the foregoing and other objects in view, the invention consists in the novel construction, combination, and arrangement of elements hereinafter described and claimed.

In the accompanying drawings.

Figure 1:
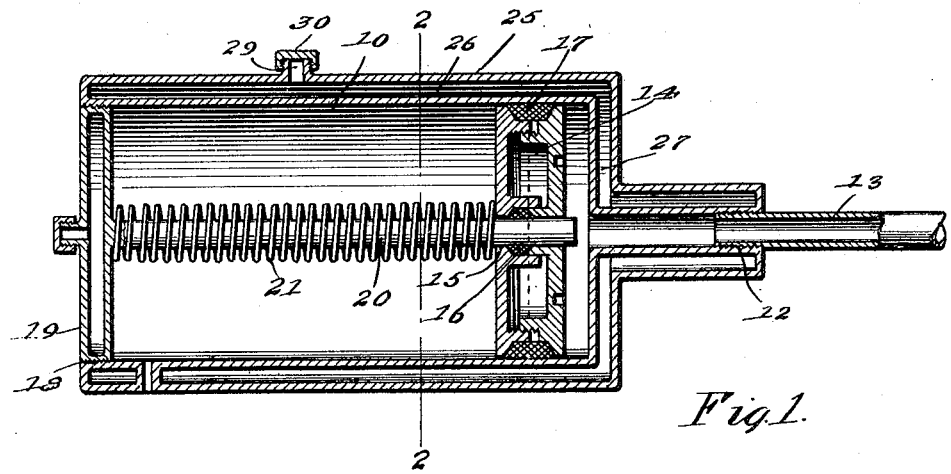
Figure 1 is a view of the device in longitudinal section.
Figure 2:
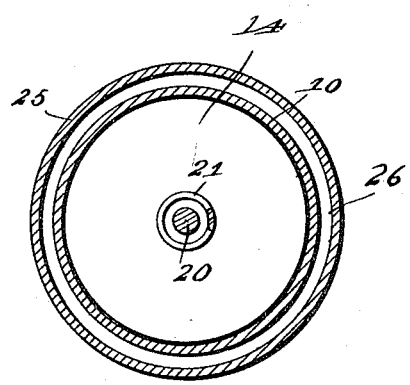
Fig. 2 is a transverse section on line 2—2 of Fig. 1.
Figure 3:
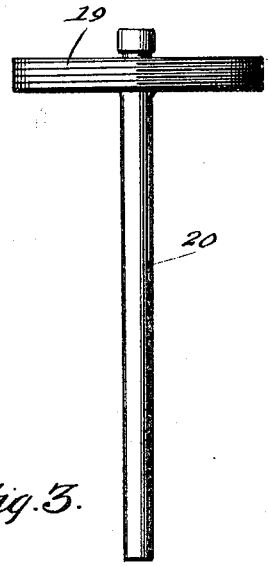
Fig. 3 is a detail of the plunger, in elevation.

In carrying out our invention we provide a cylinder 10 of any suitable diameter, said cylinder having formed thereon a pipe connection 12 permitting it to be coupled to a pipe 13 in which it is desired to prevent the water from freezing. The pipe 13 may form part of a water supply system, may be connected with the water jacket of an engine, or may be connected with a reservoir. Connection 12 and the cylinder head at the opposite end may be provided with oil chambers, and the connection 12 may be of relatively greater cross section, compared with the showing in the drawing.

A plunger 14 is mounted within the cylinder and is provided with a central bore 15 having a packing 16 therein, the plunger also carrying a packing 17 on the outer portion thereof. If the plunger is formed with an inner chamber, it may be constructed as shown.

The walls of the cylinder are threaded at one end as shown at 18, and a head 19 is threaded into the end portion of the cylinder, the head having formed thereon a stem 20 on which the plunger is slidable.

A coil spring 21 surrounds the stem and bears at one end against the head 19 and at the opposite end against the plunger. The spring is of sufficient strength to retain the plunger at that end of the cylinder opposite the head 19, under ordinary conditions, and under the usual pressure of the water in the pipe 13 with which the cylinder is connected.

Cylinder 10 is surrounded by a jacket 25 of slightly greater diameter providing an intervening annular chamber 26 and a chamber 27 at the end of the cylinder for the reception of oil, the jacket and contents serving as an insulating medium. A nipple for filling the jacket is shown at 29 and a cap therefor is designated 30.

This device will compensate for the expansion due to freezing, and will prevent the bursting of the pipe, water jacket, or other water container with which it is connected.

What is claimed is—

1. A device of the class described, comprising a cylinder, a jacket therefor providing an intermediate annular chamber and a chamber between the end of the cylinder and the end of the jacket, said chambers being in communication and having continuous walls separating them from the interior of the cylinder, a head connected with one end of the cylinder, a stem carried by the head, a plunger provided with a central bore, a packing within the bore, said plunger being slidable on the stem, a spring surrounding the stem and bearing against the head and against the plunger, the cylinder being provided with an inlet, means connecting the cylinder with a water pipe, and said cylinder being provided with an air port on one side of the plunger.

2. A device of the class described, comprising a cylinder, a jacket therefor providing an annular chamber surrounding the cylinder and a chamber at one end of the cylinder, an oil insulating medium within said chambers, means for connecting the cylinder and jacket with a water pipe to be protected, a plunger within the cylinder, and means retaining said plunger inoperative under water pressure, and permitting operation under expansion due to freezing.

3. A device of the class described, comprising a cylinder, a plunger therein, means for connecting the cylinder with a water pipe, and means retaining the plunger inoperative under water pressure, and permitting operation under expansion due to freezing.

In testimony whereof we affix our signatures.

HOYT H. BOHANNON.
CLYDE Z. HARDEN.